[19] United States Patent
Cucci

[11] Patent Number: 4,598,381
[45] Date of Patent: Jul. 1, 1986

[54] PRESSURE COMPENSATED DIFFERENTIAL PRESSURE SENSOR AND METHOD

[75] Inventor: Gerald R. Cucci, Minneapolis, Minn.

[73] Assignee: Rosemount Inc., Eden Prairie, Minn.

[21] Appl. No.: 478,504

[22] Filed: Mar. 24, 1983

[51] Int. Cl.$^4$ .................. G01C 25/00; G01N 7/00; G01L 25/00

[52] U.S. Cl. .................. 364/558; 73/708; 73/766; 364/571

[58] Field of Search .................. 364/509, 558, 571; 73/1 R, 179, 182, 714, 716, 718, 765, 766, 708, 724; 361/283

[56] References Cited

U.S. PATENT DOCUMENTS

| | | | |
|---|---|---|---|
| 3,108,183 | 10/1963 | Ganley et al. | 364/558 |
| 3,532,869 | 10/1970 | Talmo | 364/558 X |
| 4,399,515 | 8/1983 | Gross | 364/558 X |
| 4,418,392 | 11/1983 | Hata | 364/571 |
| 4,468,968 | 9/1984 | Kee | 364/558 X |
| 4,481,596 | 11/1984 | Townzen | 364/571 |

Primary Examiner—Felix D. Gruber
Assistant Examiner—Kevin J. Teska
Attorney, Agent, or Firm—Kinney & Lange

[57] ABSTRACT

A differential pressure sensor senses a difference in pressure between a first input (low) pressure or "reference pressure" and a second input (high) pressure and provides a differential sensor signal representative of the difference in pressure. The reference pressure is sensed by a reference pressure sensor which provides a reference signal representative of the reference pressure. The differential sensor signal and the reference signal are provided to a correction circuit. The correction circuit, which is preferably a digital computer, adjusts the reference signal and provides an improved output signal as a function of the differential sensor signal and the adjusted reference signal.

38 Claims, 6 Drawing Figures

PRESSURE COMPENSATED DIFFERENTIAL PRESSURE SENSOR AND METHOD

BACKGROUND OF THE INVENTION

1. Field of the Invention

The present invention relates to a differential pressure sensor which is computer compensated for reference pressure effects.

2. Prior Art

High accuracy is required for differential pressure measurements in the aerospace industry. The need for high accuracy differential pressure measurement in aerospace applications has forced the measurement of two absolute pressures using two absolute pressure sensors and then computing the difference in pressure. This type of measurement, even when pressure nonlinearity and temperature dependent errors were digitally corrected resulted in relatively large errors as a percent of required differential pressure measurements because the difference in pressure is small compared to the absolute pressures measured.

Differential pressure sensors whose differential pressure nonlinearity and temperature dependent errors were adjusted by analog circuitry and whose reference pressure dependence was mechanically compensated also failed to meet the required accuracy for differential pressure measurements. Differential pressure sensors using already available reference pressure signals for compensation by noninterchangeable analog circuitry have also failed to meet such standards.

SUMMARY OF THE INVENTION

The present invention comprises an improved apparatus for providing an adjusted signal representative of a difference in pressure between a first (reference) pressure and a second pressure. The apparatus includes differential pressure sensing means for providing a differential sensor signal representative of the difference in pressure. Changing reference pressures can cause mechanical variations of the differential pressure sensing means at equivalent differential pressures. Such variations cause undesirable effects of the reference pressure on the differential pressure sensing means to be reflected in the differential pressure signal. The reference pressure is also sensed by a reference pressure sensing means which provides a reference signal representative of the reference pressure. The reference signal may not vary linearly in response to certain reference pressures. The reference signal and the differential sensor signal are transmitted to a correcting means where the reference signal is adjusted for variances due to reference pressure such as certain nonlinear responses. The differential sensor signal may not vary linearly in response to certain differential pressures and is adjusted by the correcting means for variances due to differences in pressure such as certain nonlinear responses and adverse reference pressure effects to provide an improved output signal more representative of the difference in pressure than the differential sensor signal.

In one preferred embodiment of the invention, a temperature sensing means is included and senses a temperature representative of the temperatures of the differential pressure sensing means and the reference pressure sensing means and provides a temperature signal to the correcting means. The temperature signal may not be linearly representative of certain temperature sensed. The temperature can adversely affect the accuracies of the reference pressure sensing means and the differential pressure sensing means because of their thermal expansion characteristics. The correcting means adjusts the temperature signal for nonlinearities, the reference signal for nonlinearities and temperature dependence, and the differential sensor signal for nonlinearities, temperature dependence and reference pressure dependence to provide an enhanced output signal. The correcting means is also useful in processing the signals to reduce the effect of other predictable undesired events such as hydraulic surges and to adjust the signals for other correctable variables.

In a further preferred embodiment, the correcting means comprises a digital computer which implements a function for adjusting the signals. Such function requires correction data such as a plurality of coefficients and constants. A memory storage means provides such coefficients and constants based on the characteristics of the temperature sensing means, reference pressure sensing means, and the differential pressure setting means. Since individual sensing means may not be uniformly affected by the effects of nonlinearities, temperature dependence and reference pressure, the memory storage means comprises correction data specifically representative of each individual sensing means whose characteristics are adjusted to obtain even greater accuracy.

An advantage of the present invention is that only one high accuracy differential pressure sensor is required. The reference pressure sensing means need not be of high accuracy because the reference signal is adjusted by the correcting means thus allowing the use of a low cost, low weight, small size reference pressure sensing means.

DETAILED DESCRIPTION OF THE PREFERRED EMBODIMENTS

Figure 1:
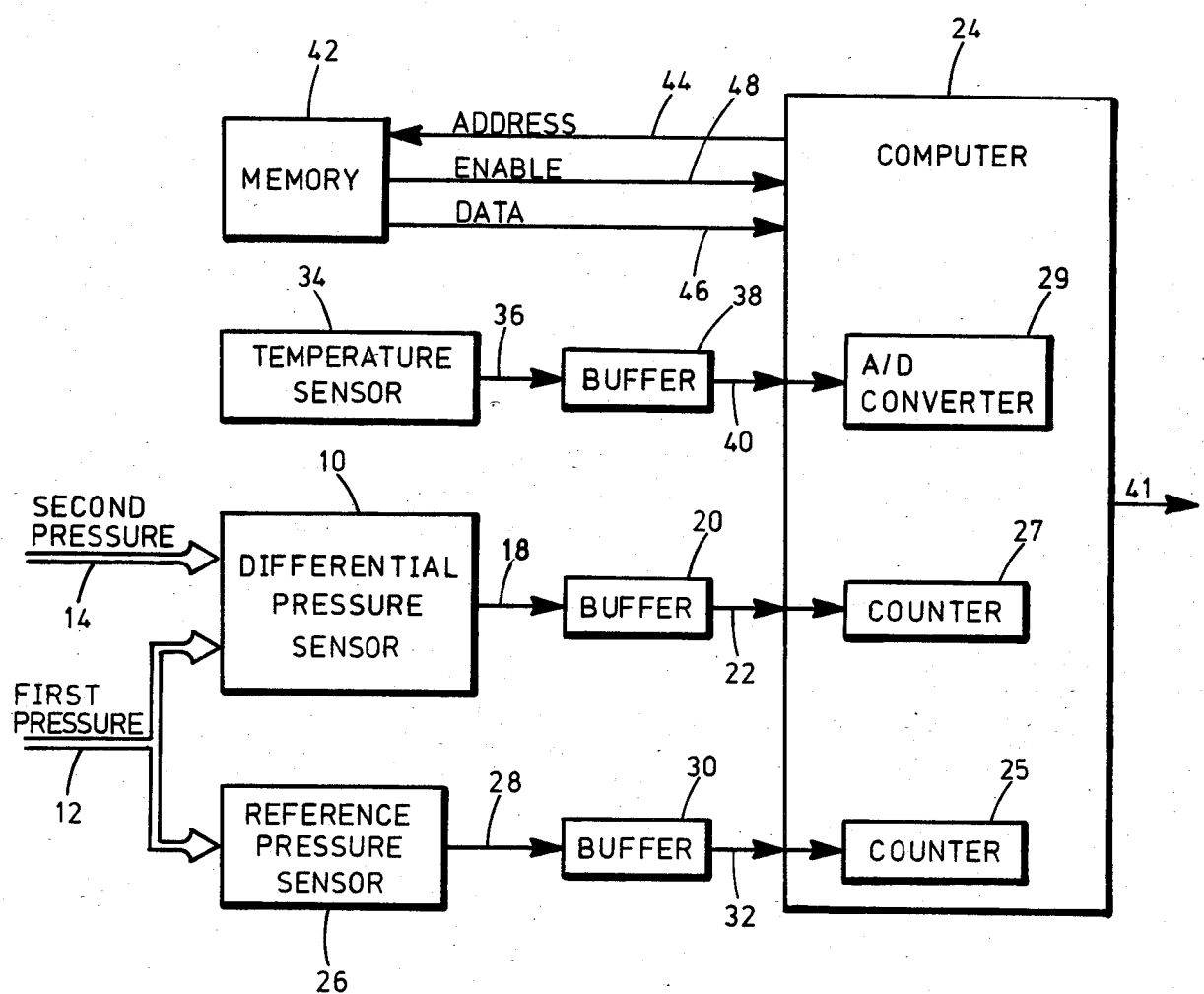
FIG. 1 is a block diagram representation of a preferred embodiment of an adjusted differential pressure sensor made according to the present invention.

In FIG. 1, a preferred embodiment of the invention comprises a differential pressure sensing means 10 such as a vibrating beam pressure sensor. Differential pressure sensing means 10 senses a difference in pressure between a first pressure or reference pressure indicated at 12 and a second pressure indicated at 14. Such difference in pressure is useful in determining air data characteristics such as airspeed and angle of attack in aerospace applications where the reference pressure corresponds to a local static pressure and the second pressure corresponds to a local pitot pressure.

Differential pressure sensing means 10 provides a differential sensor signal through a conducting means 18, such as an oscillating voltage signal, whose frequency is representative of the difference in pressure. The differential sensor signal can also be other types of electrical, pneumatic, light, defined as including electromagnetic radiation in the infrared, visible, and ultraviolet portions of the spectrum or other forms of signals representative of the difference in pressure. Conducting means 18, which can be any type of conductor compatible with the differential sensor signal, such as an electrically conductive wire, couples the uncorrected signal to a first buffer means 20. First buffer means 20 preferably comprises known conditioning circuitry such as a comparator circuit comprising an LM 193A comparator sold by National Semiconductor Corp. with a differential line driver comprising a 54LS40 driver sold by Fairchild Industries to condition the differential sensor signal for carrying by a conducting means 22 to a correcting means 24 such that correcting means 24 is coupled to the differential sensor signal. Correcting means 24 preferably is a digital computer and comprises known converting means such as counters 25, 27 and analog-to-digital converter 29 suitable for converting the differential sensor signal and other signals to a digital form compatible with correcting means 24.

The first pressure indicated at 12, is also sensed by a reference pressure sensing means 26. Reference pressure sensing means 26 preferably is an inexpensive uncorrected absolute pressure sensor such as a batch fabricated silicon piezoresistive sensor or a solid state pressure sensor. Reference pressure sensing means 26 senses the reference pressure and provides a reference signal, such as an analog voltage or an oscillating voltage, whose frequency is representative of the reference pressure or other form of signal which is carried by a conducting means 28, to a second buffer means 30 which serves to isolate reference pressure sensing means 26 from correcting means 24. Second buffer means 30 preferably comprises conditioning circuitry such as an LM 193A comparator sold by National Semiconductor Corp. with a differential line driver comprising a 54LS40 driver sold by Fairchild Industries to condition the reference signal. The reference signal is then carried to correcting means 24 by a conducting means 32. When using a piezoresistive sensor having an analog output as reference pressure sensing means 26, second buffer means 30 comprises an operational amplifier and converting means 25 comprises an analog-to-digital converter.

A temperature sensing means 34 such as a model 7006 5600 ohm±2 percent temperature sensor with a positive temperature coefficient available from AMF Incorporated/Electro Components Division, 195 McGregor St., Manchester, N.H. 03102 is positioned in or proximate to the differential pressure sensing means 10 preferably in intimate thermal contact therewith to sense the temperature of differential pressure sensing means 10 which is preferably at the same temperature as reference pressure sensing means 26. Temperature sensing means 34 provides a temperature signal such as an analog voltage or other form of signal representative of the temperature of differential pressure sensing means 10. The temperature signal is carried by a conducting means 36, to a third buffer means 38 for conditioning the temperature signal for carrying by a conducting means 40 to correcting means 24. Third buffer means 38 can be a Model LM158 operational amplifier available from National Semiconductor Corp.

Correcting means 24 preferably performs routines implemented by software or firmware. Such routines comprise functions such as a suitable lookup table or polynomial function for adjusting the reference signal as a function of the reference signal and temperature signal and adjusts the differential sensor signal as a function of the reference signal, temperature signal and differential sensor signal to provide a substantially corrected output signal on line 41, preferably a digital signal which can be converted to a 4 to 20 milliampere signal or other form of signal representative of the difference in pressure for direct readout or control purposes.

Differential pressure sensing means 10 may not respond exactly linearly to certain differences in pressure. The resultant differential sensor signal from differential pressure sensing means 10 comprises certain nonlinearities. The reference pressure also causes effects on the differential pressure sensing means 10 not representative of differences in pressure. At different magnitudes of reference pressure, differential pressure sensing means 10 provides slightly different differential sensor signals in response to the same difference in pressure, resulting in a reference pressure dependence of the differential sensor signal. Differential pressure sensing means 10 is also affected by temperature because of varying thermal expansion coefficients causing responses not representative of the difference in pressure, resulting in a temperature dependence of the differential sensor signal. At least to the extent that the above nonlinearities, reference pressure dependence and temperature dependence of differential pressure sensing means 10 are repeatable, the differential sensor signal is adjusted and substantially corrected by correcting means 24. Other predictable dependencies can also be substantially corrected by correcting means 24. Other repeatable nonlinearities and temperature dependence of reference pressure sensing means 26 reflected in the reference signal are adjusted and substantially corrected by correcting means 24 for a more accurate adjustment of the differential sensor signal. The temperature signal is also linearized by correcting means 24. A first function implemented by correcting means 24 for adjusting the signals comprises the following polynomial series:

$$Q = a + bx + cx^2 \ldots$$

where: $Q$ = output signal
$x = Z_0 - Z$
$Z_0$ = a constant
$Z$ = differential sensor signal and: $a = a_0 + a_1 Y + a_2 Y^2 + \ldots$
$b = b_0 + b_1 Y + b_2 Y^2 + \ldots$
$c = c_0 + c_1 Y + \ldots$

.
.
.

where: $Y = R_0 - R$
$R_0$ = a constant
$R$ = reference signal and $a_0 = a_{00} + a_{01} T + a_{02} T^2 + \ldots$
$a_1 = a_{10} + a_{11} T + a_{12} T^2 + \ldots$
$a_2 = a_{20} + a_{21} T \ldots$

.
.
.

and: $b_0 = b_{00} + b_{01} T + b_{02} T^2 + \ldots$
$b_1 = b_{10} + b_{11} T + \ldots$

.

and: $c_0 = c_{00} + \ldots$ where: $T$ = temperature signal,
$a_{00}, a_{01}, a_{02}, \ldots, b_{00}, b_{01}, \ldots,$
$c_{00}, c_{01}, \ldots, a_{10}, a_{11}, \ldots$ are constants.

The orders of the first function are of a magnitude sufficient to reflect meaningful correlation of Z, R, and T with respect to the sensed difference in pressure.

The first function can be reduced to comprise a preferred second function:

$$Q=(Z+a_0+a_1R+a_2R^2)\cdot(1+c_0c_1R+c_2R^2+c_3R^3)+d_0$$

where $a_0, a_1, a_2, c_0, c_1, c_2, c_3$ and $d_0$ are polynomial functions of the temperature signal of third order or less having correspondingly different constants than those of the first function. Other functions or means of compensating the differential sensor signal for nonlinearity, reference pressure dependence and temperature dependence are within the scope of the present invention. For instance, the differential sensor signal, reference signal and temperature signal can be adjusted by correcting means 24 comprising a Motorola 6800 series microprocessor based computer or an air vehicle on board air data computer to implement one or more of the above functions.

For certain differences in pressure, the differential sensor signal does vary linearly. The first and second functions accommodate such linearities with proper selection of constants. Certain linear responses of the reference signal and the temperature signal are similarly accommodated.

The first and second functions require a plurality of constants comprising correction values or data. The correction data is preferably selected to be representative of the characteristics of differential pressure sensing means 10 such that certain nonlinearities, temperature dependence and reference pressure dependence reflected in the differential sensor signal are accurately compensated by correcting means 24. The differential pressure sensing means 10, reference pressure sensing means 26 and temperature sensing means 34 are subjected to different known reference pressures, temperatures and differences in pressure and the differential sensor signal, reference signal and temperature signal are recorded at the known reference pressures, temperatures and differences in pressure. Such recorded signals are then fit to the second function using for example a least squares fit method to determine correction values such that the reference signal, temperature signal and differential sensor signal are adjusted to provide an improved output signal. The correction values are then stored in a memory storage means 42. Such values can also be theoretically determined from known design characteristics and construction materials of differential pressure sensing means 10 or an average of the data can be used for all differential pressure sensing means 10.

Memory storage means 42 is preferably a read only memory device such as a 54S472 programmable read only memory available from National Semiconductor Corp. which comprises correction data such as coefficients and constants representative of the particular characteristics of differential pressure sensing means 10 with respect to nonlinearities, reference pressure dependence and temperature dependence. Memory storage means 42 can also be integral to correcting means 24 such as core memory, disk, tape, or other similar memory device. The correction data is also preferably representative of certain nonlinearities and temperature dependence of reference pressure sensing means 26 and certain nonlinearities of temperature sensing means 34. When memory storage means 42 is addressed by correcting means 24 along an address line 44, memory storage means 42 provides an enabling signal along an enable line 48 and provides the known data to correcting means 24 through a data line 46.

The first and second functions simultaneously substantially correct the temperature signal, reference signal and differential sensor signal to provide the output signal. However, it is not necessary that corrections occur simultaneously. For example, in one preferred embodiment, correcting means 24 compensates the temperature signal for nonlinearity and then compensates the reference signal for nonlinearity and temperature dependence. Finally, the differential sensor signal is compensated for nonlinearity, temperature dependence and reference pressure dependence to provide the output signal. Each compensation is a function of the previously compensated signals and correction values after the temperature signal is compensated. Other compensation routines are within the scope of the present invention.

Figure 2:
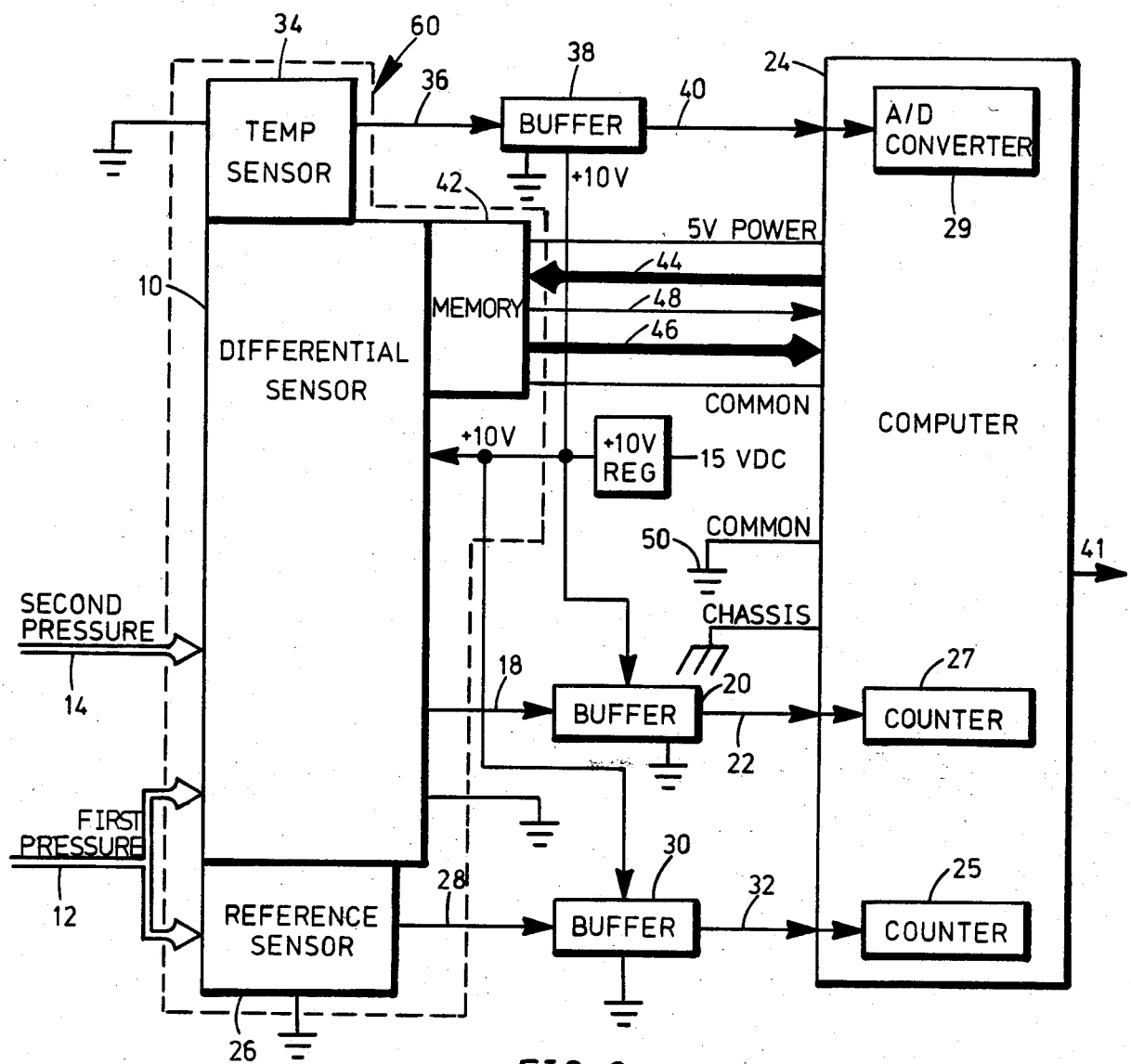
FIG. 2 is a block diagram representation of a further preferred embodiment of the adjusted differential pressure sensor of FIG. 1.

In a further preferred embodiment as seen in FIG. 2 wherein the numbering is consistent with FIG. 1, reference pressure sensing means 26 is physically coupled to the housing of differential pressure sensing means 10. A circuit common is shown at 50. Memory storage means 42 is also physically coupled to the housing of differential pressure sensing means 10. Temperature sensing means 34 is physically coupled in intimate thermal contact with differential pressure sensing means 10 and reference pressure sensing means 26 such that the sensed temperature is representative of the temperature of differential pressure sensing means 10 and reference pressure sensing means 26. When physically coupled together, differential pressure sensing means 10, reference pressure sensing means 26, temperature sensing means 34 and memory storage means 42 comprise a sensor module 60. Correction data is then generated from tests or theoretical analysis completed and the correction data representative of the characteristics of each sensor module 60 comprising nonlinearities, temperature dependencies and reference pressure dependence and other correctable variables are stored in memory storage means 42. Sensor modules 60 are then interchangeably coupled with correcting means 24 without altering the routine implemented by correcting means 24. Correcting means 24 then adjusts the temperature signal, reference signal and differential sensor signal as a function of the differential sensor signal, reference signal, temperature signal and the correction data to provide the improved output signal.

Figure 3:
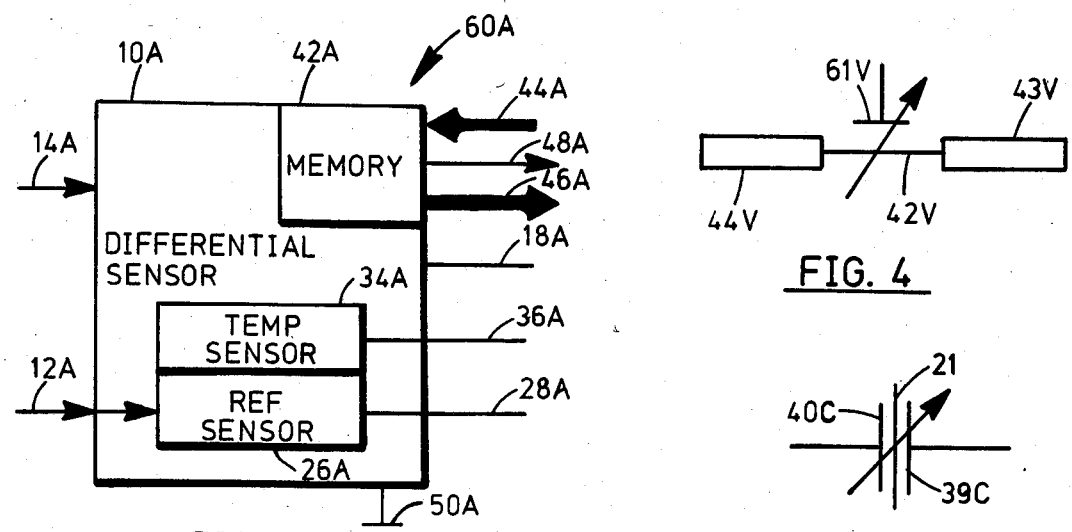
FIG. 3 is a block diagram representation of yet a further preferred embodiment of the adjusted differential pressure sensor of FIG. 1.

The present invention is less expensive than using two absolute pressure sensors as only one high accuracy differential pressure sensing means 10 at about the same cost as one accurate absolute pressure sensor is required. By determining data for sensor module 60 to be stored in memory storage means 42 by actual testing of sensor modules 60, the nonlinearities, reference pressure dependence and temperature dependence of differential pressure sensing means 10, nonlinearities and temperature dependence of reference pressure sensing means 26 and nonlinearities of temperature sensing means 34 are represented in the data. Therefore inexpensive pressure sensors such as batch fabricated silicon piezoresistive sensors or solid state pressure sensors can be used as reference pressure sensors 26. Although such sensors may have high temperature dependence and other dependencies on the order of ten (10) to twenty (20) percent, such errors can be corrected to within two (2) percent of full scale or better by correcting means 24. The inherent small size and low weight of such sensors permits aerospace packaging advantages over the use of two high accuracy absolute pressure sensors which weigh more and require more space than sensor module 60. Such packaging advantages are further enhanced as shown in FIG. 3, wherein the numbering is consistent with FIG. 2 with the addition of an "A" following each number, by including a reference pressure sensing means 26A within the housing of a differential pressure sensing means 10A. The packaging advantages are further enhanced by including a memory storage means 42A and a temperature sensing means 34A within the housing of differential pressure sensing means 10A.

Figure 4:
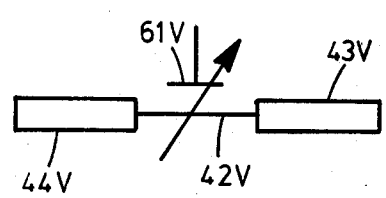
FIG. 4 is a symbolic representation of a vibrating beam type differential pressure sensor used with the present invention.

As stated above, differential pressure sensing means 10 in FIG. 1 is preferably a vibrating beam pressure sensor which is the subject of U.S. Pat. No. 4,311,053 which is incorporated by reference herein and which is assigned to the same assignee as this application. In FIG. 4, a vibrating beam section 42V such as shown in U.S. Pat. No. 4,311,055 is positioned between a first and second isolator sections 43V and 44V which support the vibrating beam section 42V under a tension or compression stress or load representative of a differential pressure. A capacitor plate 61V forms a capacitor with beam section 42V to pick off the differential pressure representative vibration frequency of beam section 42V. The vibrating beam pressure sensor is useful in aerospace applications. The linearity, temperature and reference pressure adjustments described above greatly improve performance at certain reference pressures.

Figure 5:
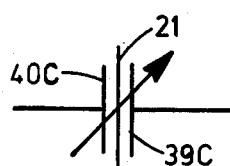
FIG. 5 is a symbolic representation of a capacitive type differential pressure sensor used with the present invention and FIG. 6 is a block diagram representation of a preferred two wire embodiment of an adjusted differential pressure sensor made according to the present invention.

In a further preferred embodiment, differential pressure sensing means 10 of FIG. 1 comprises a capacitive type sensor such as the sensor of U.S. Pat. No. 3,646,538 which is incorporated herein by reference and which is assigned to the same assignee as this application, or the capacitive sensor of U.S. Pat. No. 4,389,895 hereby incorporated by reference and assigned to the same assignee as this application coupled with known circuitry or the capacitive transducer of U.S. Pat. No. 4,370,890 which is incorporated herein by reference and which is assigned to the same assignee as this application coupled with known circuitry. The difference in pressure when sensed by the capacitive type sensor of U.S. Pat. No. 3,646,538 is useful for determining velocity of flow of a fluid through an orifice in a conduit where the reference pressure and the second pressure correspond to pressures the fluid in the pipe exerts on opposite sides of the orifice. The capacitive sensors are represented in FIG. 5 and comprise a sensing diaphragm 21 such as shown in U.S. Pat. No. 3,646,538 whose position varies in response to the difference in pressure which is applied across it. On opposite sides of sensing diaphragm 21 are capacitor plates 39C and 40C. The changes in capacitance between sensing diaphragm 21 and diaphragm plates 39C and 40C are representative of the difference in pressure. Performance of the capacitive sensors is greatly enhanced by the linearity, temperature and reference pressure adjustments of the present invention. In many velocity of flow applications, the reference pressures can be many orders of magnitude higher than the differential pressure desired to be sensed. The two absolute pressure sensor approach fails because its full scale errors can be large compared to the differential pressure. Prior art differential pressure sensors' reference pressure errors are also large compared to the differential pressure at high reference pressures. The present invention compensates for reference pressure thus permitting accurate sensing of the differential pressure.

The present invention also permits design considerations other than reference pressure dependence, nonlinearity and temperature dependence to be evaluated. Repeatability of performance becomes primarily important. Materials and designs are selected for repeatability of performance with respect to time, temperature, pressure and linearity. With repeatable errors compensated for by the present invention, longer term performance is permitted to be improved by the selection of appropriate materials and mechanical designs. The invention as described above and further described below is powered in a conventional manner.

Figure 6:
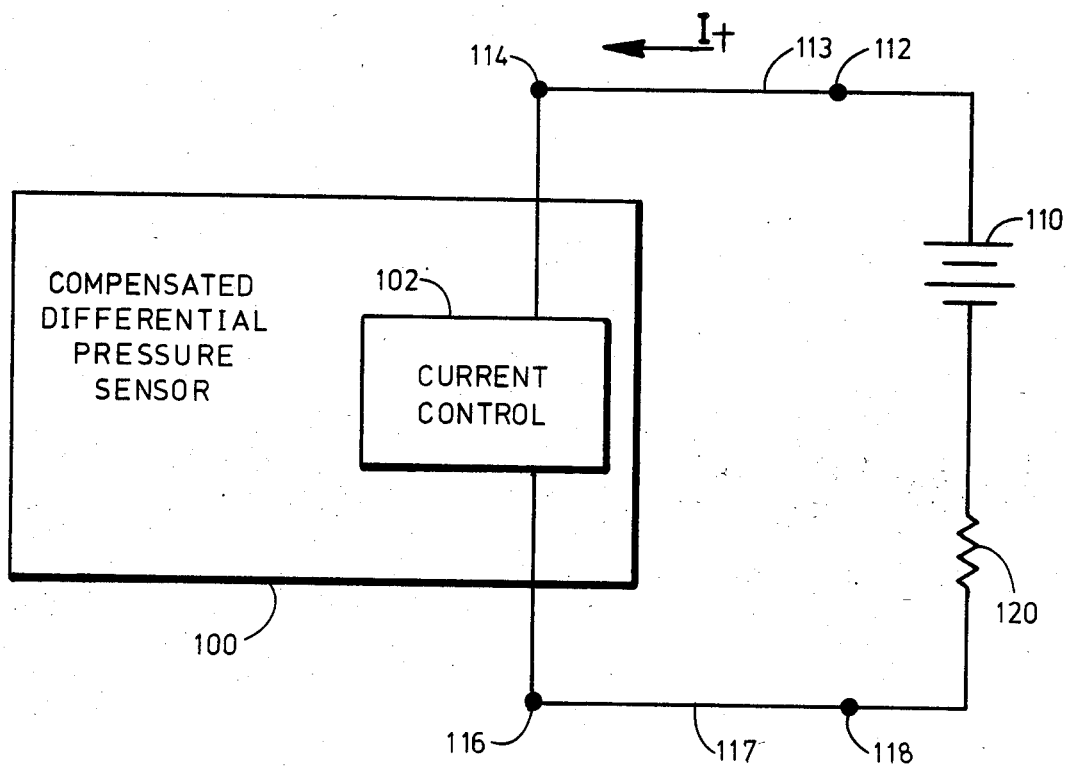

In FIG. 6, a typical arrangement for use of a compensated differential pressure sensor 100 per the present invention in combination with a two wire process control system is shown in block diagrams. In this instance, compensated sensor 100 comprises a current control means 102. Compensated sensor 100 provides a control signal to the current control means 102 for controlling a signal such as a DC current $I_t$, such that $I_t$ is representative of a difference in pressure. The current $I_t$ also provides power in a conventional two wire manner to compensated sensor 100.

The two wire system of the present invention includes a direct current supply 110 having a line for carrying the current $I_t$ connected in series through a first terminal 112 through a line 113 to a first input terminal 114 to compensated sensor 100 and current control means 102. The current $I_t$ is then carried through a line to a second input terminal 116 through a line 117 to a second terminal 118. A load means 120 is coupled to second terminal 118 and in turn is connected in series with the supply 110 thus completing the two wire current path. Load means 120 may comprise an actuator, a controller, a recorder or simply a current indicating instrument. The connections of supply 110 and compensated sensor 100 can also be made so that they are similar to that shown in U.S. Pat. No. 3,764,880 which shows a DC to DC converter.

Current control means 102 controls the total DC current $I_t$ which is preferably an industry standard 4-20 milliamp signal or other form of signal such that the current $I_t$ is representative of the difference in pressure and provides power to compensated sensor 100. When $I_t$ is a 4-20 milliamp signal, components of compensated sensor 100 must be selected to operate solely on 4 milliamps of current or less when $I_t$ is 4 milliamps.

As previously stated, the present invention can be used in determining airspeed of an aircraft. AERONAUTICAL RADIO, INC. (ARINC) of 2551 Riva Rd., Annapolis, Md. 21401 is a company that formulates standards for electronic equipment and systems for airlines. The standards are finalized after investigation, coordination and general agreement with the airlines, with other aircraft operators, with the military services having similar requirements and with equipment manufacturers. For determining indicated airspeed, the greatest differential pressure for subsonic aircraft to be measured by the present invention is approximately 5.4 PSI (pounds per square inch) (37.2 kPa (kilopascal)). Reference pressure can be as high as approximately 15.6 PSI (107.7 kPa) at about 500 meters below sea level while second pressure can be as high as approximately 21 PSI (144.9 kPa) at speeds approaching the speed of sound and at low altitudes. To meet a 1978 standard set by ARINC, for indicated airspeed determination using two separate absolute pressure sensors, the implied accuracy of the sensors respectively is 0.013 percent full scale and 0.014 percent full scale. The accuracies are based on a maximum error for the differential pressure of approximately 0.005 PSI (0.034 kPa). Presently available absolute pressure sensors are accurate to about 0.02 percent full scale which would result in a possible error of $0.0002 \times 21 = 0.0042$ PSI ($0.0002 \times 144.9 = 0.0290$ kPa) considering just one of the absolute pressure sensors. The additional error of the second absolute pressure sensor makes it improbable that the ARINC standard can presently be met by the two absolute pressure sensor approach as the error of one absolute sensor is about the same as the allowed maximum differential error of 0.005 PSI (0.034 kPa). However, the present invention meets the ARINC standard. In FIG. 1 to determine airspeed using differential pressure sensing means 10 with reference pressure sensing means 26, differential pressure sensing means 10 is required to have a range of at least 0 to 5.4 PSI (37.2 kPa) corresponding to the greatest difference in pressure to be measured and reference pressure sensing means 26 is required to have a range of from 0 to 15.6 PSI (107.7 kPa). The standard then implies from the worst case error based on the indicated airspeed that the total accuracy of differential pressure sensing means 10 must be at least 0.09 percent full scale to remain within 0.005 PSI (0.034 kPa) of the differential pressure. Deviations in the differential sensor signal caused by reference pressure dependencies can be 0.25 percent full scale for reference pressures equivalent to full scale differential pressures, which is well above the total 0.09 percent full scale accuracy required to meet the ARINC standard. If the total accuracy of reference pressure sensing means 26 is 2 percent, a 50:1 correction of reference pressure dependencies is achievable. The reference pressure for subsonic aircraft varies between 2.56 PSI (17.6 kPa) at an altitude of approximately 12,600 meters and 15.6 PSI (107.6 kPa) at 500 meters below sea level for a total change of 13 PSI (90 kPa). Such change is about twice full scale of differential pressure sensing means 10 which doubles the total reference pressure dependency to 0.5 percent of full scale. Thus the 50:1 correction reduces the reference pressure dependency of differential pressure sensing means 10 thereby increasing accuracy with respect to reference pressure dependency to about 0.01 percent full scale or 0.00054 PSI (0.0037 kPa) resulting in embodiments of the present invention performing better than the ARINC standard. Thus the present invention meets even greater performance standards than are presently required.

Sensor devices built in accordance with the present invention have been tested to determine the effectiveness of the present invention in improving the accuracy of differential pressure measurements. The sensor devices easily exceeded the ARINC standard when the corrections were taken into account. The sensor devices utilized the second function. Such sensor devices comrised a vibrating beam type differential pressure sensing mans 10 with a range of 0-16 PSI (110 kPa). For such sensor devices, the worst total deviations from actual differential pressure varied from 0.0021 PSI (0.015 kPa) to 0.0039 PSI (0.027 kPa) while subjected to wide ranges of temperature, reference pressure and differential pressures exceeding those expected to be encountered in subsonic aerospace applications.

What is claimed is:

1. Apparatus for sensing a difference in pressure between a first pressure and a second pressure and providing an output signal representative of the difference in pressure, the apparatus comprising:
   differential pressure sensing means for providing a differential sensor signal representative of the difference in pressure between the first and second pressures;
   reference pressure sensing means for providing a reference sensor signal representative of the first pressure;
   memory storage means for providing correction data for known errors in the reference sensor signal and the differential sensor signal; and
   correcting means for providing the output signal as a function of the reference sensor signal, the differential sensor signal and the correction data, the output signal being more representative of the difference in pressure than is the differential sensor signal as a result of correction for known errors in both the reference sensor signal and the differential sensor signal.

2. The apparatus of claim 1 wherein the differential sensor signal does not vary linearly in response to variations in the difference in pressure between the first and second pressures and wherein the correction data comprises data representative of the differential sensor signal nonlinearities.

3. The apparatus of claim 1 wherein the reference sensor signal does not vary linearly in response to variations in the first pressure and wherein the correction data comprises data representative of the reference sensor signal nonlinearities.

4. The apparatus of claim 3 wherein the differential sensor signal does not vary linearly in response to variations in the difference in pressure between the first and second pressures and wherein the correction data further comprises data representative of the differential sensor signal nonlinearities.

5. The apparatus of claim 1 wherein accuracy of the differential sensor signal is affected by variations in the first pressure and wherein the correction data comprises data representative of effects of variations in the first pressure on the differential sensor signal.

6. The apparatus of claim 5 wherein the differential sensor signal does not vary linearly in response to variations in the difference in pressure between the first and second pressures and wherein the correction data further comprises data representative of nonlinearities in the differential sensor signal, and wherein the reference sensor signal does not vary linearly in response to variations in the first pressure and wherein the correction data further comprises data representative of nonlinearities in the reference sensor signal.

7. The apparatus of claim 6 further comprising temperature sensing means for providing a temperature signal representative of the temperature of the apparatus.

8. The apparatus of claim 7 wherein accuracy of the reference sensor signal is affected by variations in the temperature of the apparatus and wherein the correction data comprises data representative of effects of variation in the temperature on the reference sensor signal.

9. The apparatus of claim 8 wherein accuracy of the differential sensor signal is affected by variations in the temperature of the apparatus and wherein the correction data comprises data representative of effects of variation in the temperature on the differential sensor signal.

10. The apparatus of claim 9 wherein the temperature signal does not vary linearly in response to variation in temperature of the apparatus and wherein the correction data comprises data representative of nonlinearities in the temperature signal.

11. The apparatus of claim 1 further comprising temperature sensing means for providing a temperature signal representative of the temperature of the apparatus.

12. The apparatus of claim 11 wherein the correcting means comprises a digital computer which provides the output signal in accordance with the formula $$a + bx + cx^2 + \ldots$$

where: $x = Z_0 - Z$
$Z = $ the differential sensor signal
$Z_0 = $ correction data and: $a = a_0 + a_1 Y + a_2 Y^2 + \ldots$
$b = b_0 + b_1 Y + b_2 Y^2 + \ldots$
$c = c_0 + c_1 Y + c_2 Y^2 + \ldots$ where: $Y = R_0 - R$
$R = $ the reference sensor signal
$R_0 = $ correction data and: $a_0 = a_{00} + a_{01} T + a_{02} T^2 + \ldots$
$a_1 = a_{10} + a_{11} T + a_{12} T^2 + \ldots$
$a_2 = a_{20} + a_{21} T + \ldots$ and: $b_0 = b_{00} + b_{01} T + b_{02} T^2 + \ldots$
$b_1 = b_{10} + b_{11} T + \ldots$ and: $c_0 = c_{00} + c_{01} T + \ldots$ where: $T = $ the temperature signal
and: $a_{00}, a_{01} \ldots, b_{00}, b_{01}, \ldots,$
$c_{00}, c_{01}, \ldots, a_{10}, a_{11}, \ldots$ are correction data.

13. The apparatus of claim 12 wherein selected correction data are chosen as a zero value and the formula $$a + bx + cx^2 + \ldots$$

comprises the formula $$(Z + a_0 + a_1 R + a_2 R^2)(1 + c_0 + c_1 R + c_2 R^2 + c_3 R^3) + d_0$$

wherein: $a_0, a_1, a_2, c_0, c_1, c_2, c_3$ and $d_0$ are functions of the temperature signal of third order or less having correspondingly different correction data.

14. The apparatus of claim 11 wherein the reference pressure sensing means is physically coupled to the differential pressure sensing means and the correcting means adjusts the reference sensor signal simultaneously with the adjustment of the differential sensor signal.

15. The apparatus of claim 14 wherein the temperature sensing means is physically coupled in intimate thermal contact with the differential pressure sensing means and the correcting means adjusts for nonlinearities in the temperature signal simultaneously with the adjustment of the reference sensor signal and the output signal.

16. The apparatus of claim 15 wherein the memory storage means is physically coupled to the differential pressure sensing means such that the differential pressure sensing means, reference pressure sensing means, temperature sensing means and memory storage means comprise a sensor module which is interchangeably connectable to the correcting means.

17. The apparatus of claim 16 wherein the memory storage means comprises a read only memory device.

18. The apparatus of claim 1 having two terminals for connection to two wires from a series connected source of DC voltage and a load, through which a direct current signal flows, the apparatus further comprising:
current control means coupled to the two terminals for controlling the direct current signal as a function of the output signal such that the direct current signal is representative of the difference in pressure and provides sole energization of the apparatus.

19. The apparatus of claim 18 further comprising temperature sensing means for providing a temperature signal representative of the temperature of the apparatus.

20. The apparatus of claim 18 wherein the direct current signal comprises a signal varying between 4 milliamperes and 20 milliamperes.

21. A method of determining a difference in pressure between a first pressure and a second pressure and providing an output signal representative of the difference comprising the steps of:
sensing the difference in pressure between the first and second pressures;
providing a differential signal representative of the sensed difference in pressure;
sensing the first pressure;
providing a reference signal representative of the sensed first pressure;
calculating a corrected differential pressure value as a function of the differential signal, the reference signal and previously stored correction values which provide corrections for known correctable errors in the differential signal and the reference signal; and
providing the output signal as a function of the corrected differential pressure value.

22. The method of claim 21 wherein:
the difference in pressure is sensed by a differential pressure sensor;
the first pressure is sensed by a reference pressure sensor;
the correction values are stored in a memory device; and
a digital computer calculates the corrected differential pressure value and provides the output signal.

23. The method of claim 22 wherein the differential pressure sensor comprises a capacitive type differential pressure sensor.

24. The method of claim 22 wherein the differential pressure sensor comprises a vibrating beam type differential pressure sensor.

25. The method of claim 22 wherein the reference pressure sensor comprises an absolute pressure sensor which can be adjusted to two percent accuracy or less.

26. The method of claim 22 wherein the memory device comprises a read only memory.

27. The method of claim 22 wherein accuracy of the reference signal is affected by variations in the first pressure and wherein accuracy of the differential signal is affected by variations in the difference in pressure and by variations in the first pressure.

28. The method of claim 27 wherein the correction values comprise data representative of nonlinearities of the reference signal with variations in the first pressure, of nonlinearities of the differential signal with variations in the difference in pressure, and variations in the differential signal as a function of variations in the first pressure.

29. A method of determining a difference in pressure at variable temperatures between a first pressure and a second pressure and providing an output signal representative of the difference in pressure comprising the steps of:
sensing the difference in pressure;
providing a differential signal representative of the sensed difference in pressure;
sensing the first pressure;
providing a reference signal representative of the sensed first pressure;
sensing the temperature;
providing a temperature signal representative of the sensed temperature;
adjusting the temperature signal as a function of the temperature signal and a first set of previously stored correction values;
adjusting the reference signal as a function of the adjusted temperature signal, the reference signal and a second set of previously stored correction values; and
providing the output signal as a function of the adjusted temperature signal, the adjusted reference signal, the differential signal and a third set of previously stored correction values.

30. The method of claim 29 wherein;
the difference in pressure is sensed by a differential pressure sensor;
the first pressure is sensed by a reference pressure sensor;
the temperature is sensed by a temperature sensor;
the first, second and third sets of correction values are stored in a memory device; and
a digital computer adjusts the temperature signal, the reference signal, and provides the output signal.

31. The method of claim 30 wherein the digital computer provides the output signal in accordance with the formula $$a + bx + cx^2 + \ldots$$

where: $x = Z_0 - Z$
$Z$ = the differential signal
$Z_0$ = a correction value of the third set and: $a = a_0 + a_1 Y + a_2 Y^2 + \ldots$
$b = b_0 + b_1 Y + b_2 Y^2 + \ldots$
$c = c_0 + c_1 Y + c_2 Y^2 + \ldots$ where: $Y = R_0 - R$
$R$ = the reference signal
$R_0$ = a correction value of the second set -continued and: $a_0 = a_{00} + a_{01} T + a_{02} T^2 + \ldots$
$a_1 = a_{10} + a_{11} T + a_{12} T^2 + \ldots$
$a_2 = a_{20} + a_{21} T + \ldots$ and: $b_0 = b_{00} + b_{01} T + b_{02} T^2 + \ldots$
$b_1 = b_{10} + b_{11} T + \ldots$ and: $c_0 = c_{00} + c_{01} T + \ldots$ where: $T$ = the temperature signal
and: $a_{00}, a_{01} \ldots, b_{00}, b_{01}, \ldots, c_{00}, c_{01}, \ldots, a_{10}, a_{11}, \ldots$ are correction values.

32. The method of claim 31 wherein selected correction values from among the first, second and third sets are chosen to have a zero value and the formula $$a + bx + cx^2 + \ldots$$

comprises the formula $$(Z + a_0 + a_1 R + a_2 R^2)(1 + c_0 + c_1 R + c_2 R^2 + c_3 R^3) + d_0$$

wherein: $a_0, a_1, a_2, c_0, c_1, c_2, c_3$, and $d_0$ are functions of the temperature signal of third order or less having correspondingly different correction values.

33. A two wire differential pressure sensing apparatus having two terminals for connection to two wires from a series connected source of DC voltage and a load through which a DC current of variable magnitude flows, the DC current providing sole energization for the apparatus, the apparatus comprising:
differential pressure sensor means for providing a differential sensor signal which is a function of a difference in pressure between first and second pressures;
reference pressure sensor means for providing a reference sensor signal which is a function of the first pressure;
temperature sensor means for providing a temperature sensor signal which is representative of temperature of the apparatus;
memory means for storing correction data uniquely associated with the differential pressure sensor means, the reference pressure sensor means and the temperature sensor means for correcting known correctable errors in the differential sensor signal, the reference sensor signal and the temperature sensor signal;
digital computer means for computing a corrected differential pressure value based upon the differential sensor signal, the reference sensor signal, the temperature sensor signal and the correction data and for producing a control signal as a function of the corrected differential pressure value; and
current control means coupled to the two terminals for controlling the magnitude of the DC current as a function of the control signal so that the magnitude of the DC current is representative of the corrected differential pressure value.

34. Apparatus for sensing a difference in pressure between a first pressure and a second pressure and providing an output signal representative of the difference in pressure, the apparatus comprising:

differential pressure sensor means for providing a differential sensor signal which is a function of the difference in pressure between the first and second pressures;

reference pressure sensor means for providing a reference sensor signal which is a function of the first pressure;

memory storage means for providing correction data for reference sensor signal nonlinearities, differential sensor signal nonlinearities, and effects of variations of the reference sensor signal on the differential sensor signal; and correcting means for providing the output signal as a function of the reference sensor signal, the differential sensor signal and the correction data, the output signal being more representative of the difference in pressure than is the differential sensor signal as a result of correction for the reference sensor signal nonlinearities, the differential sensor signal nonlinearities, and the effects of variation of the reference sensor signal on the differential sensor signal.

35. Apparatus for sensing a difference in pressure between a first pressure and a second pressure and providing a corrected differential pressure value representative of the difference in pressure, the apparatus comprising:

differential pressure sensor means for providing a differential sensor signal which is a function of the difference in pressure between the first and second pressures;

reference pressure sensor means for providing a reference sensor signal which is a function of the first pressure;

memory storage means for providing correction data for reference sensor signal nonlinearities, differential sensor signal nonlinearities, and effects of variations of the reference sensor signal on the differential sensor signal; and means for calculating the corrected differential pressure value based upon a predetermined formula which includes the reference sensor signal, the differential sensor signal and the correction data, the formula providing correction for the reference sensor signal nonlinearities, the differential sensor signal nonlinearities, and the effects of variation of the reference sensor signal on the differential sensor signal.

36. The apparatus of claim 35 and further comprising:

temperature sensor means for providing a temperature sensor signal which is representative of temperature of the apparatus;

wherein the memory storage means also provides correction data for effects of variation in temperature on the differential sensor signal and the reference sensor signal and temperature sensor signal nonlinearities; and wherein the formula used by means for calculating also includes the temperature signal and the correction data for effects of variation in temperature and temperature sensor signal nonlinearities.

37. A method of determining a difference in pressure between a first pressure and a second pressure comprising the steps of:

sensing the difference in pressure between the first and second pressures;

providing a differential signal value representative of the sensed difference in pressure;

sensing the first pressure;

providing a reference signal value representative of the sensed first pressure;

calculating a corrected differential pressure value based upon a formula which includes the differential signal value, the reference signal value and previously stored correction values representing corrections for known correctable errors in the differential signal value and the reference signal value; and providing the output signal as a function of the corrected differential pressure value.

38. A method of determining a difference in pressure at variable temperatures between a first pressure and a second pressure and providing an output signal representative of the difference in pressure comprising the steps of:

sensing the difference in pressure;

providing a differential signal value representative of the sensed difference in pressure;

sensing the first pressure;

providing a reference signal value representative of the second first pressure;

sensing the temperature;

providing a temperature signal value representative of the sensed temperature;

calculating a corrected differential pressure value using a formula which simultaneously adjusts the differential signal value, the reference signal value, and the temperature signal value based upon a set of previously stored correction values; and providing the output signal as a function of the corrected differential pressure value.

* * * * *

UNITED STATES PATENT AND TRADEMARK OFFICE
CERTIFICATE OF CORRECTION

PATENT NO. : 4,598,381

DATED : July 1, 1986

INVENTOR(S) : Gerald R. Cucci

It is certified that error appears in the above-identified patent and that said Letters Patent is hereby corrected as shown below:

In column 1, line 67, the word "temperature" should read --temperatures--.

In column 2, line 20, the word "setting" should read --sensing--.

In column 5, line 18, the part of the equation reading "$c_0 c_1$" should read --$c_0 + c_1$--.

In column 7, line 32, "U.S. Pat. No. 4,311,055" should read --U.S. Pat. No. 4,311,053--.

In column 10, line 3, the word "mans 10" should read --means 10--.

Signed and Sealed this

Fourteenth Day of October, 1986

[SEAL]

*Attest:*

DONALD J. QUIGG

*Attesting Officer*  *Commissioner of Patents and Trademarks*